Patented Aug. 26, 1930

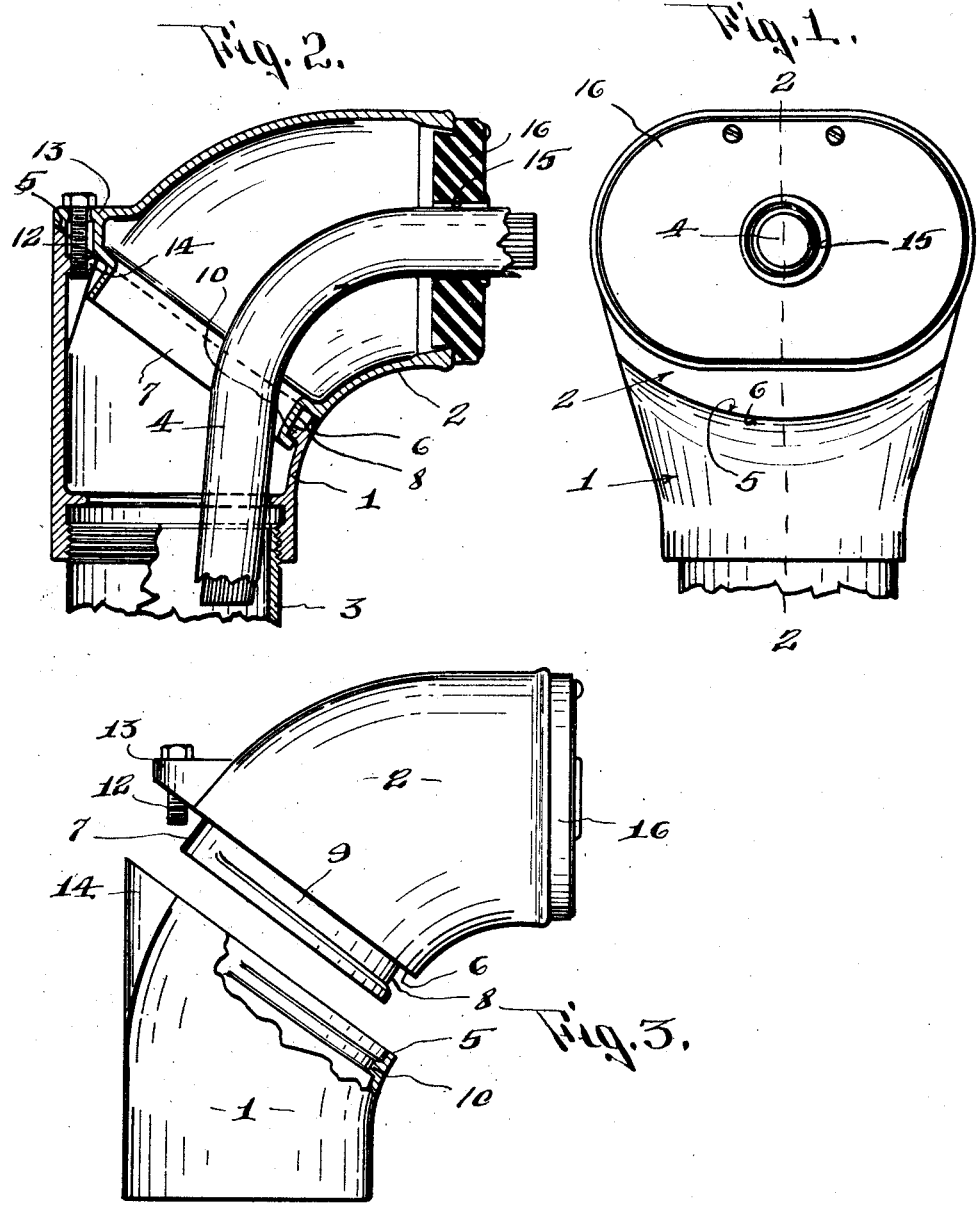

1,774,151

UNITED STATES PATENT OFFICE

RAYMOND H. OLLEY, OF SYRACUSE, NEW YORK, ASSIGNOR TO CROUSE-HINDS COMPANY, OF SYRACUSE, NEW YORK, A CORPORATION OF NEW YORK

CONDUIT OUTLET BOX

Application filed March 19, 1928. Serial No. 262,772.

This invention relates to conduit outlet boxes and has for its object, a particularly simple and efficient means for securing two sections of an outlet box together, which sections are arranged at an angle to each other and have inclined abutting end faces acting incline plane fashion on each other to clamp the sections together.

The invention consists in the novel features and in the combinations and constructions hereinafter set forth and claimed In describing this invention, reference is had to the accompanying drawing in which like characters designate corresponding parts in all the views.

Figure 1 is a front elevation of a conduit outlet box provided with my invention.

Figure 2 is a sectional view on line 2—2, Figure 1.

Figure 3 is an elevation of the sections showing the same separated.

This conduit outlet box comprises two sections arranged at an angle to each other and having marginal abutting inclined faces, coacting wedge means located at the interior angle formed by the sections and means on the exterior angle side of the sections for effecting sliding movement of the sections along their inclined faces and bringing the wedge means into coacting position to clamp the sections toward each other.

1 and 2 designate the sections of the box which are arranged at an angle to each other, these sections being shown as arc shaped. The section 1 constitutes a base for the section 2 and is mountable upon the end of a conduit 3 which encloses the conductors as a cable 4.

5 and 6 are the marginal abutting end faces of the sections and as the sections are arc shaped, these faces extend in planes radial relatively to the arc. One of the sections here shown as the section 2 is formed with a flange 7 telescoping into the other section and extending beyond the bearing face 6, the flange being a closed one or continuous or tubular.

The flange 7 is formed with a channel 8 on the side thereof toward the interior angle formed by the sections, this channel 8 also extending at 9 along the sides of the flange 7, and the side of the flange or the exterior angle side of the sections being unprovided with a channel.

10 is an internal rib provided in the section 1, this rib constituting a wedge for entering the channel 8, but being of less width than the channel, the rib being spaced apart from the abutting bearing face 5 of the section 1. This rib is arranged on the section 1 in a position corresponding to the channel 8 of the section 2.

The means for moving the sections along their inclined abutting faces and causing the wedge 10 to coact with the wall of the channel 8 to clamp the sections toward each other as one section is moved along the abutting faces relatively to the other section, comprises a screw 12 located on the exterior angle side of the section, this screw extending at an angle to the faces 5 and 6 and in a direction parallel to the axis of the conduit receiving end of section 1.

As here illustrated, the screw extends through a lug 13 on the outside of the section 2 and threads into a lug 14 on the section 1, these lugs having abutting faces which are continuations of the faces 6 and 5. The head of the screw is exposed on the top side of the section 2. The passage in the lug 13 is slightly larger than the screw 12 to allow the sliding movement of the section 2 in reference to section 1 and the screw 12 (Figure 2).

The cable 4 extends through an opening 15 in a closure 16 of insulation at the upper end of the section 2.

In operation, the cable 4 is pulled through the pipe 3 and the section 1 and is then passed through the section 2 which is detached from the section 1. The section 2 is then brought into abutting relation to the section 1 with the wedge 10 in the channel 8 and the screw 12 tightened, thus sliding the section 2 along the section 1 and clamping the sections toward each other by reason of the action of the wedge means and the action of the screw due to the arrangement of the screw at an angle to the inclined faces.

What I claim is:

1. A conduit outlet box comprising sections arranged at an angle to each other and having opposing marginal abutting faces at their abutting ends, coacting wedge means arranged on the sections respectively and means for sliding the sections at their abutting faces relatively to each other to engage the wedge means comprising a screw extending through one section and threading into the other, the screw being arranged at an inclined angle to the abutting faces.

2. A conduit outlet box comprising sections arranged at an angle to each other and having opposing marginal faces at their abutting ends, the sections having coacting wedge means at their abutting faces located at the interior angle formed by said sections and means located at the exterior angle formed by said sections for effecting relative sliding movement of the sections along said abutting faces and bringing the wedge means into wedging engagement.

3. A conduit outlet box comprising sections arranged at an angle to each other and having opposing marginal faces at their abutting ends, the sections having coacting wedge means at their abutting faces located at the interior angle formed by said sections and operating means located at the exterior angle formed by said sections for effecting relative sliding movement of the sections along said abutting faces and bringing the wedge means into wedging engagement, the operating means comprising a screw having its head exposed on the outer side of one of the sections on the exterior angle side thereof and threading into the other section in a direction lengthwise of the other section and at an angle to the inclined abutting faces.

4. A conduit outlet box comprising two sections arranged at an angle to each other and having marginal faces at their abutting ends, one section having a flange telescoping into the other and formed with an external channel on the interior angle side of the sections and the other section having a wedge for entering the channel, the sections being provided on the exterior angle side thereof and at their abutting ends with outwardly extending lugs having faces which are continuations of the faces of the sections, a screw extending through the lugs in a direction lengthwise of one section and at an angle to said faces, the screw having its head exposed on the outer side of one of the lugs.

In testimony whereof, I have hereunto signed my name, at Syracuse, in the county of Onondaga, and in the State of New York, this 8th day of March, 1928.

RAYMOND H. OLLEY.